(12) United States Patent
Carlsson

(10) Patent No.: US 7,431,156 B2
(45) Date of Patent: Oct. 7, 2008

(54) FILM CASSETTE, RACK AND RELIEF TROLLEY FOR THE FILM CASSETTE, AND METHOD OF HANDLING THE FILM CASSETTE

(75) Inventor: Reimer Carlsson, Strömstad (SE)

(73) Assignee: Carlsson Equipment AB (SE)

( * ) Notice: Subject to any disclaimer, the term of this patent is extended or adjusted under 35 U.S.C. 154(b) by 274 days.

(21) Appl. No.: 10/531,749

(22) PCT Filed: Oct. 20, 2003

(86) PCT No.: PCT/SE03/01625

§ 371 (c)(1),
(2), (4) Date: Apr. 18, 2005

(87) PCT Pub. No.: WO2004/035447

PCT Pub. Date: Apr. 29, 2004

(65) Prior Publication Data

US 2006/0043693 A1    Mar. 2, 2006

(30) Foreign Application Priority Data

Oct. 21, 2002  (SE) .................................... 0203082

(51) Int. Cl.
*B65D 85/02* (2006.01)
(52) U.S. Cl. .................................... 206/387.1; 206/398
(58) Field of Classification Search ................. 206/307, 206/387.1, 387.12, 387.14, 389, 398, 401
See application file for complete search history.

(56) References Cited

U.S. PATENT DOCUMENTS 3,169,682 A * 2/1965 Hollingsworth .............. 206/404
3,493,188 A * 2/1970 Krtous ........................ 242/348
3,552,551 A * 1/1971 Goldberg et al. ............. 206/403
3,744,828 A * 7/1973 Goldberg ....................... 292/59

(Continued)

FOREIGN PATENT DOCUMENTS

DE    39 34 861 A1    2/1991

(Continued)

*Primary Examiner*—Jeffrey J Restifo
(74) *Attorney, Agent, or Firm*—Lerner, David, Littenberg, Krumholz & Mentlik, LLP

(57) ABSTRACT

The present invention relates to a cassette for storing cinema film rolls (7). The cassette (14) comprises a first portion (15) and a second portion (16) which are essentially plane-parallel and separated by a spacing which exceeds the thickness of a cinema film roll (7) and connected by a connecting part (17). The cassette (14) also has an opening (18). The invention is characterized in that the cassette (14) comprises bearing supports (25, 26) for weight-relief against a horizontal circular table (4, 5) when the film roll (7) is moved between the cassette (14) and the circular table (4, 5). The invention also relates to a method of transferring a cinema film roll (7) between a storage cassette (14) and an essentially horizontal circular table (4, 5). The cassette is positioned so that bearing supports (25, 26) of the cassette (14) bear against the circular table (4, 5) and so that a contact edge (27) of the cassette (14) is fitted against the peripheral edge (28) of the circular table (4, 5). In this position, the film is moved between the cassette and the circular table. The present invention also relates to a rack (40) and a relief trolley (46) intended for cassettes (14) as described above.

6 Claims, 7 Drawing Sheets

U.S. PATENT DOCUMENTS

| | | | | |
|---|---|---|---|---|
| 3,812,960 A | * | 5/1974 | Falletta et al. | 206/394 |
| 4,030,602 A | * | 6/1977 | Muller et al. | 206/404 |
| 4,176,744 A | * | 12/1979 | Borzak | 206/303 |
| 5,226,610 A | * | 7/1993 | Urlik | 206/406 |
| 5,472,088 A | * | 12/1995 | Roberts et al. | 206/394 |
| 5,560,481 A | * | 10/1996 | Doodson et al. | 206/387.1 |
| 5,913,423 A | * | 6/1999 | Sasaki | 206/387.12 |

FOREIGN PATENT DOCUMENTS

| | | |
|---|---|---|
| GB | 749570 A | 5/1956 |
| GB | 1 471 033 A | 4/1977 |
| SE | 318 781 B | 5/1969 |
| SE | 358 866 B | 10/1970 |

* cited by examiner

FILM CASSETTE, RACK AND RELIEF TROLLEY FOR THE FILM CASSETTE, AND METHOD OF HANDLING THE FILM CASSETTE

TECHNICAL FIELD

The present invention relates to a cassette for storing cinema film rolls, where the cassette comprises a first portion and a second portion, which portions are essentially plane-parallel and separated by a spacing which exceeds the thickness of a cinema film roll and connected by a connecting part, which cassette has an opening.

The present invention also relates to a method of transferring a cinema film roll from an essentially horizontal circular table to a storage cassette.

The present invention also relates to a rack and a relief trolley intended for cassettes as described above.

BACKGROUND ART

A 35 millimeter feature film for showing in cinemas of normal long film length has the approximate dimensions height 35 mm and diameter 50-100 cm while the weight lies roughly between 15 and 45 kg. Such a film roll is sensitive to knocks and shocks in the lateral direction, which can cause an annular support cylinder, or a centre ring, arranged in the centre of the film to fall out of the film strip wound onto it. If this happens, the film strip which falls out together with the centre ring forms a spiral, which in most cases results in the film having to be discarded. Today, therefore, for transport between distributors and film producers, between cinemas and distributors and between cinemas, it is preferred to divide the film up into several parts, roughly 5-10 pieces, in order to obtain smaller and lighter rolls which are easier to handle. When a film divided into several parts as described above has arrived at a cinema, it is unpacked. The various film parts are then wound up in order on a table, where the splices between the film parts are joined together by adhesive strips adapted for the purpose. The result is a continuous feature film with approximate dimensions as mentioned above. The film is then wound over onto a first of several what are known as circular tables which rotate essentially horizontally and are fastened rotatably to a stable stand, the tables and the stand constituting a film tower, these towers being common today. The film strip is led from the first circular table to a projector arranged in the cinema via a number of film-leading rollers. After having been guided through the projector, the film strip is wound up into a complete film roll again on a second circular table, belonging to the same film tower, as the film is shown. In this connection, the film is again guided via a number of film-leading rollers. It is usual for the film to be unwound from the centre of the film roll when it is being shown.

After the film has been shown, it has to be rewound in order that the film strip will lie in the correct direction for the next showing. The film roll is then wound up again on the first circular table. If, however, as mentioned above, the film is unwound from the centre of the film roll instead of from its periphery, no rewinding is required. If another film is to be shown subsequently, for example on account of the fact that different films are to be shown at different times, the film has to be lifted down from the first circular table of the projector tower and stored until the next showing. It may also be the case that the film has to be moved to another screen within a multiplex cinema. Such movement of the film roll is today as a rule performed by one person holding a piece of fibreboard or the like at the level of the first circular table of the projector tower while another person carefully pulls the film roll across onto the board from the circular table. This movement work is risky for both the film roll and personnel as the centre of gravity of the board is located a long way from the body, which places great stress on the arms and back, at the same time as a mistake or momentary imbalance on the part of one of the persons involved can result in the film being dropped and ruined. The film roll is stored by the board with the film roll being leant against a wall. In this connection, accidental knocking of the board or the film can result in the centre ring falling out and the associated film also falling out from the middle and forming a spiral as described above. The whole film or parts of it must then be discarded. The film roll is therefore stored open and is also unprotected from dust and other dirt which may have a detrimental effect on the film.

When the programme is changed and a new film is to be shown and the current film is to be sent on, for example to another town or back to the distributor, the current film is separated into the original pieces and is wound onto the original small rolls for delivery to the next cinema or return to the distributor. When the film is sent on to another cinema, it has to be assembled into a complete film roll again, as described above. To have to separate the film and then assemble it again for each relatively long transfer is time-consuming and causes unnecessary wear to the film.

GB 1471033 A discloses a case which is arranged so as to contain two film rolls, one roll in each half of the case. The case protects the films when they are transported.

GB 1471033 A does not, however, disclose handling of complete, spliced-together cinema films which are to be moved to or from a circular table belonging to a film tower.

DISCLOSURE OF INVENTION

It is an object of the present invention to provide a device for handling complete, spliced-together cinema film rolls which are to be moved to or from a circular table belonging to a film tower. The said device is also to be adapted for storage and transport of the film rolls.

It is also an object of the present invention to provide a method of handling complete, spliced-together cinema film rolls which are to be moved to or from a circular table belonging to a film tower.

These objects are achieved by a device and a method according to patent claims 1, 12 and 13 below, that is to say a device and a method as described in the introduction.

Furthermore, the device is characterized in that the cassette comprises bearing supports for weight-relief against an essentially horizontal circular table when the film roll is moved between the cassette and the circular table.

Furthermore, the method is characterized in that it comprises lifting up and positioning the cassette so that bearing supports of the cassette come to rest on the circular table, fitting a contact edge of the cassette against the circular table, which contact edge is adapted on the whole to follow the peripheral shape of the circular table. The method also comprises retaining the cassette in this position with one hand at the same time as the film roll is guided into or out of the cassette, away from or out onto the circular table by a portion of the film roll being taken hold of with the other hand, and finally lifting the cassette down for further storage.

The present invention also relates to a rack and a relief trolley intended for cassettes as described above, the features of the rack and the relief trolley emerging from the characterizing part of patent claim 7 and, respectively, 8 below.

Examples of advantages which are achieved with the present invention are:

it is possible for only one person to handle the film roll in all stages of movement;

the risk of the film being damaged during handling is minimized;

the device according to the invention can be used as a storage container for the spliced-together complete film roll.

Preferred embodiments of the present invention emerge from the dependent patent claims.

DESCRIPTION OF FIGURES

The invention will be described below in connection with preferred illustrative embodiments and the accompanying figures, in which.

PREFERRED EMBODIMENTS

Figure 1:
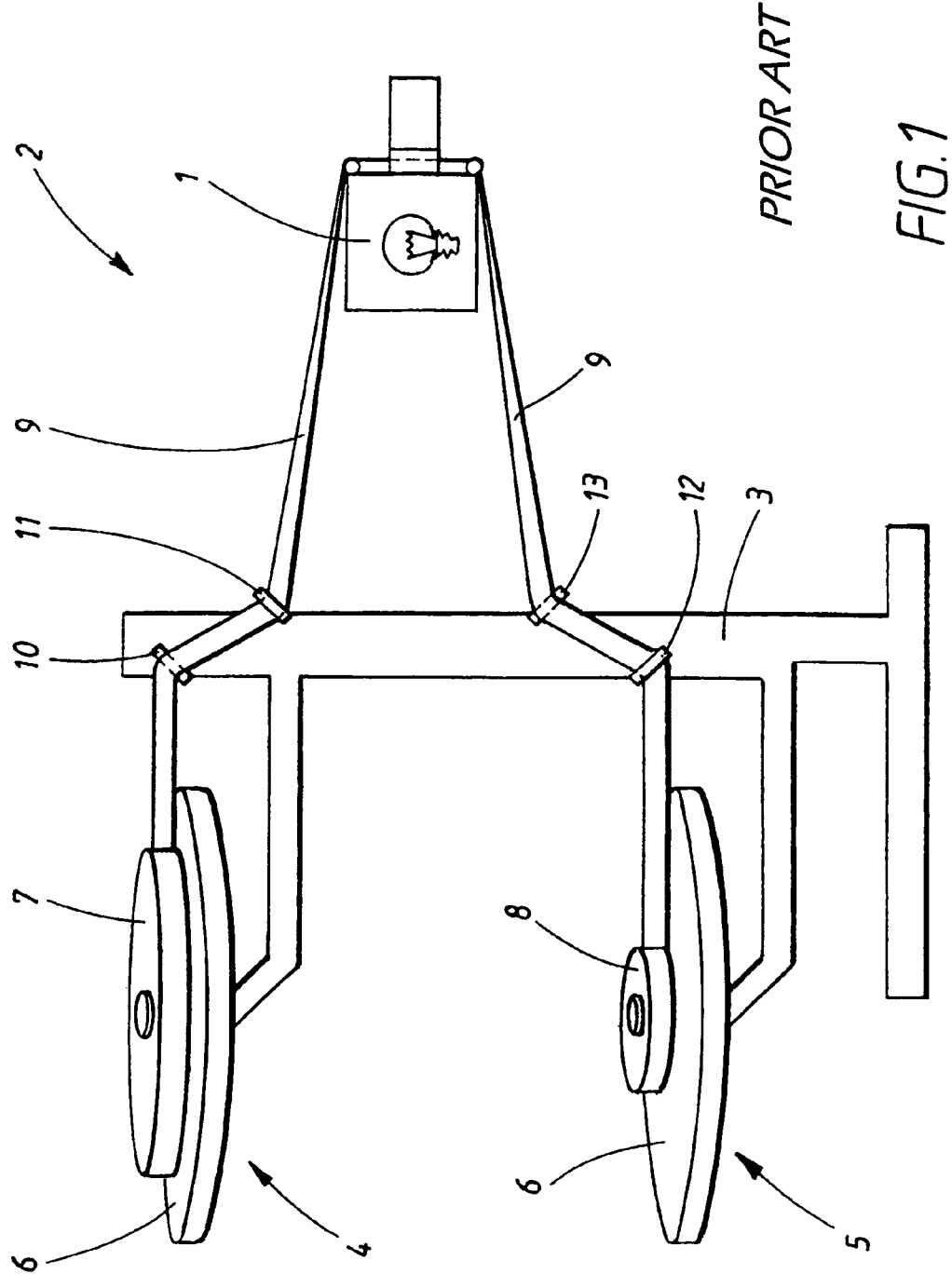
FIG. 1 shows diagrammatically the arrangement when a film is shown in a cinema.

Known equipment for showing films is today found in a projector room. This equipment comprises, with reference to FIG. 1, a film projector 1 of known kind and a film tower 2 which is also previously known per se. The film tower 2 comprises a relatively stable stand 3 which supports two or more horizontal circular tables 4, 5, which circular tables 4, 5 are rotatably mounted round plates with at least one relatively plane surface 6 which can serve as a bearing surface for film rolls 7, 8. This bearing surface 6 is referred to below as the film surface. When a film is being shown, the film strip 9 is led from the first circular table 4 to the projector 1, through the projector 1 and then back to the second circular table 5 belonging to the film tower 2, on which second circular table 5 the film which has been shown is wound up. In this connection, the film strip 9 is led by means of a number of film-leading rollers 10, 11, 12, 13 of the film tower 2 so as to lie at the correct angle in relation to the projector 1, both between the first circular table 4 and the projector 1 and between the projector 1 and the second circular table 5. The system of rollers can be more or less complicated than that shown in FIG. 1, the system of rollers shown being intended only as an illustration for exemplification. It is also usual for the film to be unwound from the centre of the film roll 7, 8 instead of from its periphery as shown in FIG. 1.

When the whole film has been shown, it is necessary for the film to be rewound before it can be shown again, in order that the sequence of events of the film will be reproduced in the correct order. Rewinding takes place from the second circular table 5 to the first circular table 4. If the same film is to be shown again, showing and rewinding is repeated. If, however, as mentioned above, the film is unwound from the centre of the film roll 7, 8 instead of from its periphery, no rewinding is required. If the current film roll 7, 8 is to be exchanged, that is to say moved from the first circular table 4, use is made of the device according to the present invention.

Figure 2:
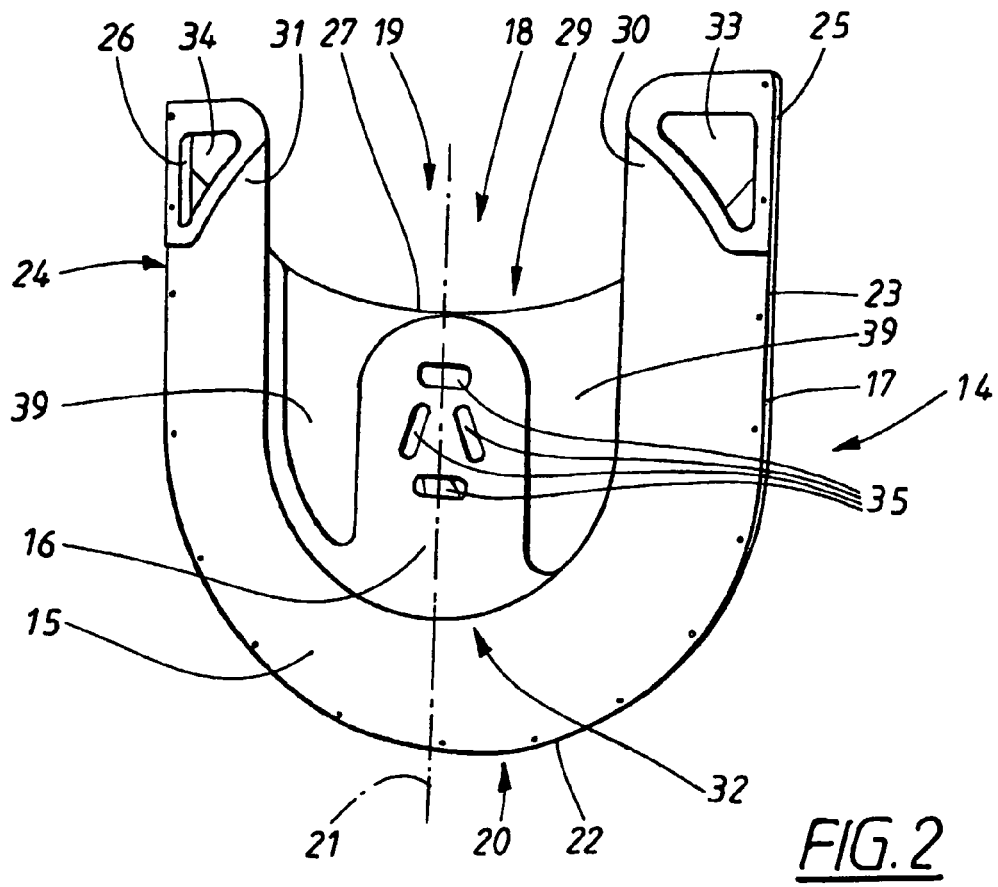
FIG. 2 shows a first perspective view of a cassette according to the invention.
Figure 3:
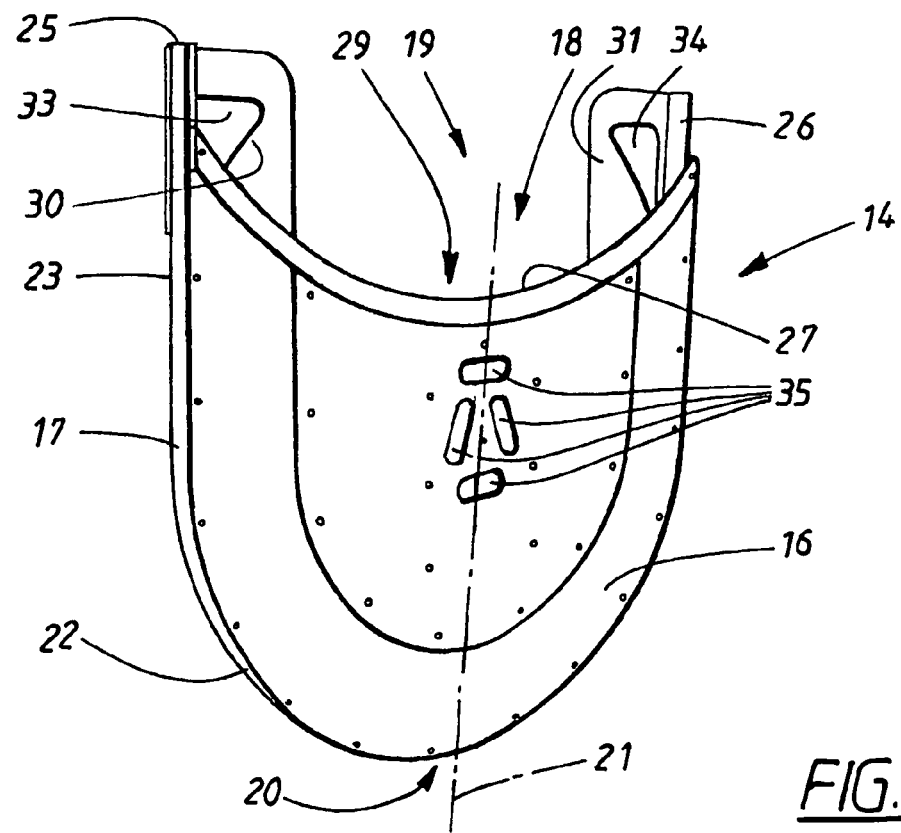
FIG. 3 shows a second perspective view of a cassette according to the invention.

The said device consists, with reference to FIGS. 2 and 3, of a cassette 14 which comprises a first and a second portion 15 and, respectively, 16, which portions 15, 16 are essentially plane-parallel and separated by a spacing which exceeds the thickness of a normal film roll. The first and second portions 15, 16 are fixed relative to one another by a connecting part 17, the inner side of which will face a film roll when such a roll is inserted in the cassette 14. The connecting part 17 is discontinuous so that the cassette has an opening 18. The cassette 14 has an opening side 19, intended for insertion and removal of a film roll through the opening 18, and an opposite receiving side 20. The cassette is also symmetrical about a centre line 21 which divides the two portions 15, 16 into two equal halves and extends between the opening side 19 and the receiving side 20.

Figure 4:
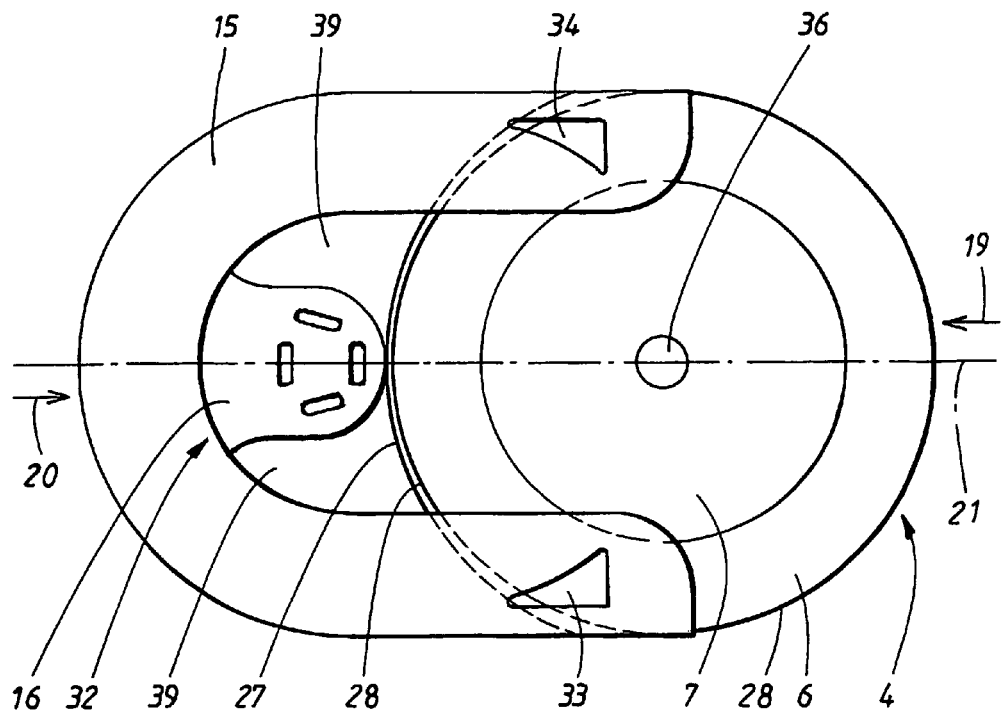
FIG. 4 shows diagrammatically how the cassette according to the invention is used when a film roll is transferred.

A receiving portion 22 of the inner side of the connecting part 17 also has a curved shape along the receiving side 20, which curved shape essentially follows the peripheral curved shape of a film roll, this receiving portion 22 preferably being semi-circular. The receiving portion 22 of the connecting part 17 then merges with two opposite end legs 23, 24 which extend towards the opening side 20 and run on either side of the centre line 21 so that the connecting part 17 will overall have a U-shape. The connecting part 17 will then constitute a partly curved plane, essentially at right angles to the planes of the first and second portions 15, 16. The ends of the end legs both constitute bearing supports 25, 26 which, with reference to FIG. 4, are arranged so as to bear supportingly against the film surface 6 of a circular table 4, that is to say that surface of the circular table 4 where film rolls are intended to rest, while a contact edge 27 as described below essentially bears against an edge 28 of the circular table 4, 5. The parts of the connecting part 17 which constitute the bearing supports 25, 26 are free in relation to the second portion 16 but not to the first portion 15.

The second portion 16 has a curved contact recess 29 which extends in such a way that it is divided into two equal parts by the centre line 21 and forms the abovementioned contact edge 27 which faces the opening side 19 and is adapted essentially to follow the peripheral shape of a circular table 4. This contact edge 27 is preferably designed so that on the whole it fits most of the sizes there are of circular tables of film towers, that is to say it is preferably at least concave.

The delimiting contours of the first and second portions 15, 16 preferably follow the external shape of the connecting part 17, which, as the connecting part 17 is relatively thin-walled, follows the internal shape. The first portion 15 has two carrying legs 30, 31 which lie against the end legs 23, 24 of the connecting part. Between the carrying legs 30, 31, the first portion 15 is provided with a gripping recess 32, shown as curved in the figures, which, in the direction of the centre line 21, is positioned between the contact recess 29 of the second portion and the curved receiving portion 22 of the connecting part. The gripping recess 32 extends, just as the contact recess 29 does, in such a way that it is divided into two equal parts by the centre line 21 and faces in the same direction as the contact recess 29 and the curved receiving portion 22 of the connecting part. This positioning and design of the gripping recess 32 is to be regarded as only an example; the important aspect is that it performs its function as described below.

Arranged peripherally in each carrying leg 30, 31 for ergonomic handling of the cassette 14 is at least one handle 33, 34. At least one handle 35 is also arranged centrally in the second portion 16.

The handling of the cassette 14 in connection with moving complete, spliced-together cinema films to or from a circular table 4 belonging to a film tower 2 will now be described in greater detail with reference to FIGS. 1-4. The prerequisite for the following example is that a complete film roll 7 is positioned on the film surface 6 of a circular table 4. The film roll 7 is rolled up around a centre ring 36 which is preferably made of metal or plastic. An operator lifts the cassette 14 up by suitable handles 33, 34, 35 and guides the opening side 19 towards the circular table 4 with the film roll 7, with the first and second portions 15, 16 essentially parallel to the film surface 6 of the circular table. The cassette is positioned with the bearing supports 25, 26 resting against the film surface 6 so that the second portion 16 is located at essentially the same level as the film surface 6, with the contact edge 27 belonging to the second portion 16 bearing as far as fit allows against the edge 28 of the circular table, the diameter of the circular table being shown in FIG. 4 as somewhat smaller than would afford a virtually perfect fit between the contact edge 27 and the edge 28 of the circular table. The first portion 15 will then be located a little way from the film surface 6; with reference directions according to FIG. 1, the first portion 15 will be located above the film surface 6. The operator can hold the cassette 14 in this position with one hand and at the same time with the other hand take hold of the centre ring 36 and pull the film roll 7 across the film surface 6 towards the cassette 14. The film roll 7 is pulled further over onto the second portion 16, and into the cassette 14, so that finally the film roll 7 bears against, or is located in proximity to, the curved receiving portion 22, adapted to the peripheral shape of the film roll, of the inner side of the connecting part. In this connection, the gripping recess 32 is adapted so that a part of the centre ring 36 which can be taken hold of with a hand is free in relation to the first portion 15 and allows the centre ring 36 of the film roll to be taken hold of in all situations.

Next, the operator lets go of the film roll 7 and takes hold of the cassette 14 by suitable handles 33, 34, 35 and lifts it down with the curved receiving portion 22 of the connecting part facing downwards, so that the film roll 7 rests against its inner side. The film roll 7 is now partly enclosed by the first portion 15, the second portion 16 and the connecting part 17, with the receiving side 20 directed downwards. In this state, the film can be leant against a wall or stored in a suitable storage device. Examples of such storage devices will be given below.

The film roll 7 can be transported or stored in the cassette 14, for which reason there is no need to separate the film into smaller parts. The cassette 14 can be provided with a close-fitting cover (not shown) for dust-free storage or for transport.

Figure 5:
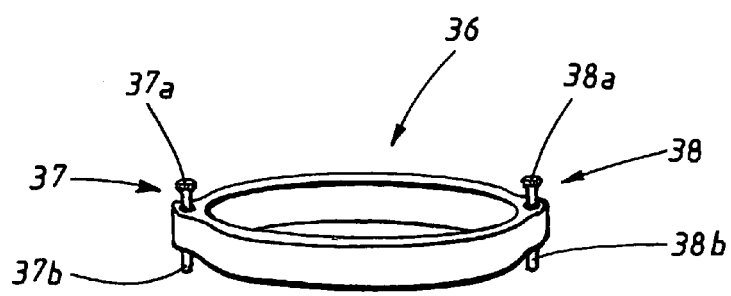
FIG. 5 shows a perspective view of a centre ring.

If a film roll 7 stored in a cassette 14 according to the invention is to be placed on a circular table 4 for showing, the cassette 14 is lifted up and positioned with the bearing supports 25, 26 resting against the film surface 6 in the same way as described above, when the film was to be moved from the circular table 4 to the cassette 14. Thanks to the gripping recess 32, the centre ring 36 can be taken hold of, which means the operator can now let go of the cassette with one hand and take hold of the centre ring 36 and pull the film 7 out of the cassette 14 and onto the film surface 6. The centre ring 36 is adapted so as, by means of spring-loaded movable pins 37, 38, with a gripping part 37a, 38a and a fastening part 37b, 38b, which are shown in FIG. 5, to engage in guide holes (not shown) provided for them in the circular table 4 so that the film roll 7 is located in a correctly centred manner on the circular table 4. The operator can then put the cassette 14 down on the floor. A part 39 of the second portion 16 is preferably recessed in relation to the rest of the second portion 16, which recessed part 39 is adapted in such a way that the pins 37, 38 of the centre ring 36 do not bear against the second portion 16. Another function of the gripping recess 32 is that any protruding parts, especially the gripping parts 37a, 38a, of the pins 37, 38, do not catch on the first portion 15.

Figure 6:
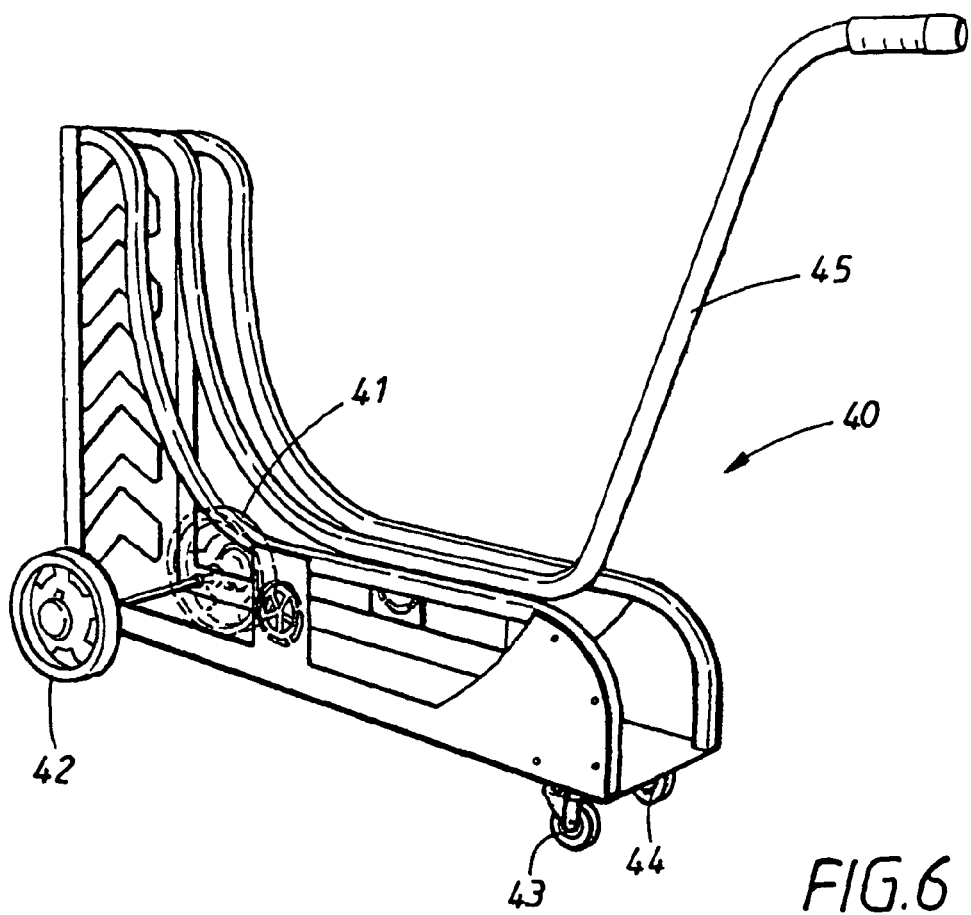
FIG. 6 shows a perspective view of a rack intended for a cassette according to the invention.
Figure 7:
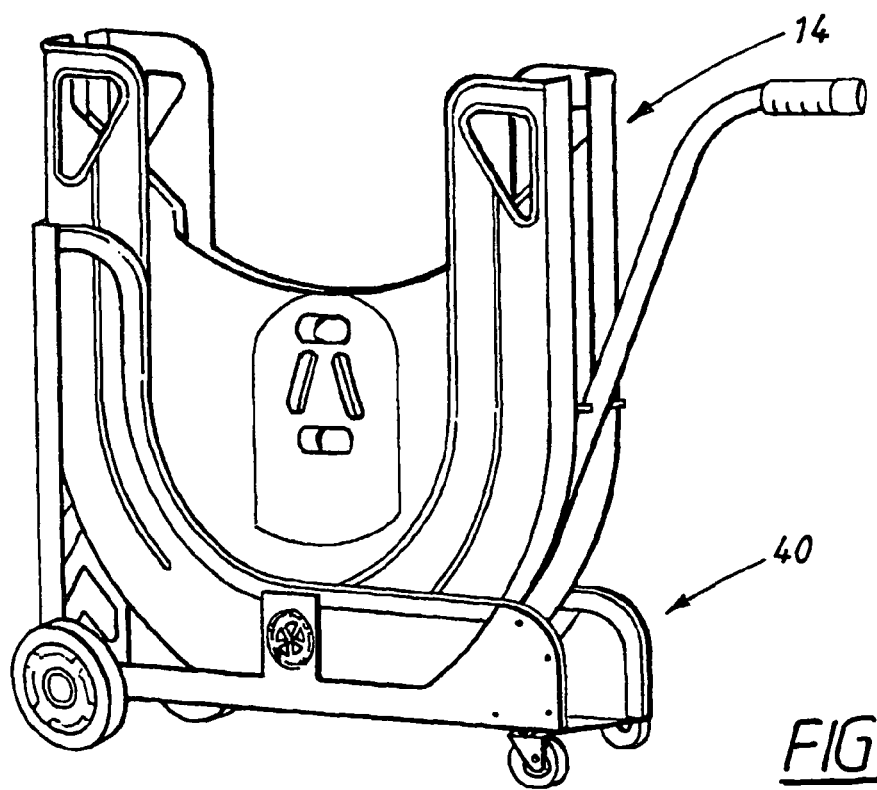
FIG. 7 shows a perspective view of a rack according to FIG. 6 with a cassette according to the invention located therein.

FIG. 6 shows a rack 40 arranged for cassettes 14 according to the invention, the rack 40 being intended for two cassettes which are positioned upright with the receiving side 20 downwards. The rack 40 is provided with wheels 41, 42, 43, 44 and a handle 45 for transporting cassettes over relatively short distances. The rack 40 can also be used for storing cassettes. In a variant, the rack 40 can be intended for fewer or more cassettes than shown in the example. Furthermore, the rack 40 can have no wheels and instead be intended for permanent positioning. FIG. 7 shows a cassette 14 located in a rack 40 as described above.

Figure 8:
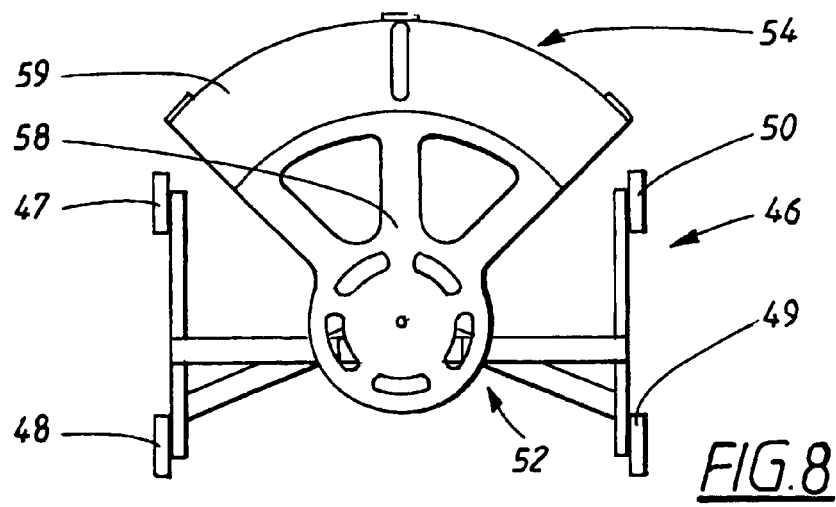
FIGS. 8-12 show views of a relief trolley for handling a cassette according to the invention.
Figure 9:
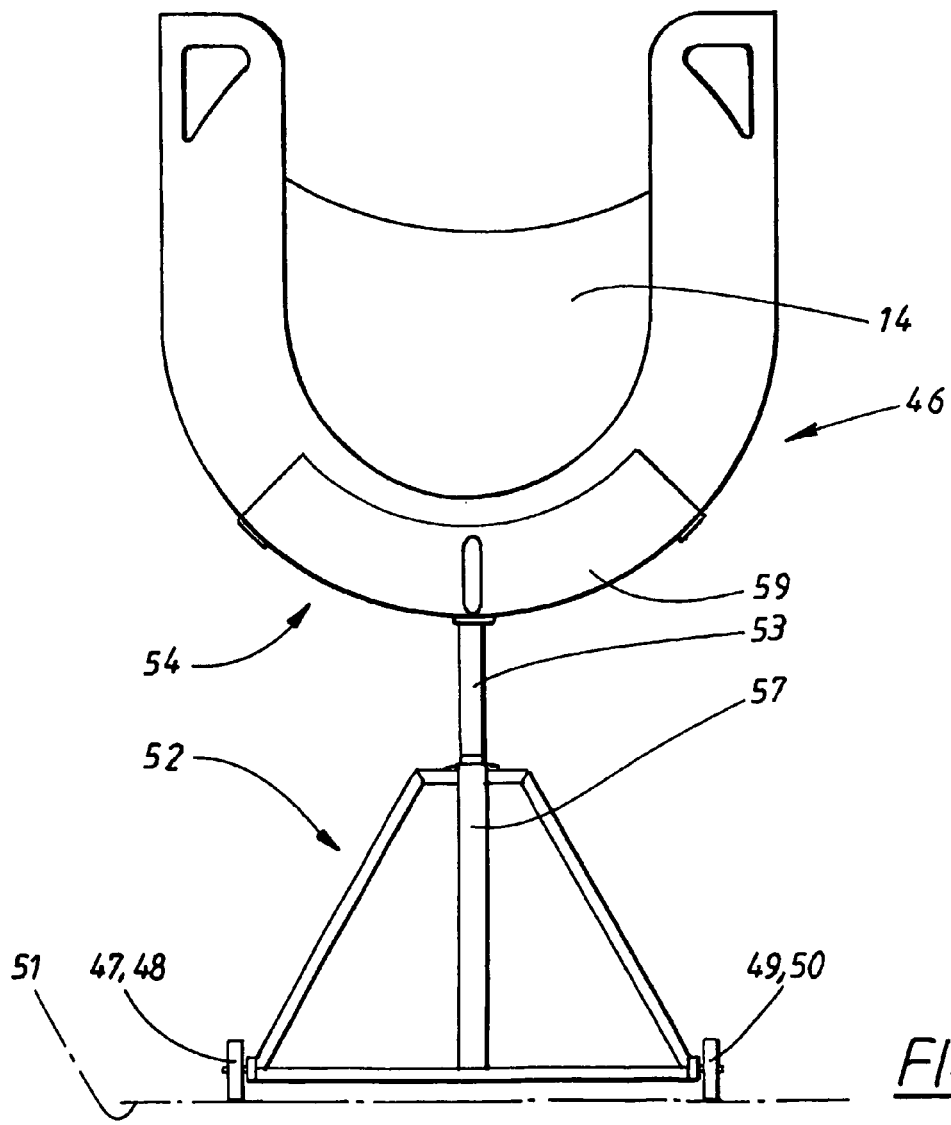

FIGS. 8-12 show various views of a relief trolley 46 adapted for cassettes 14 according to the invention. The trolley 46 is movable by virtue of the fact that it rests on wheels 47, 48, 49, 50 which can move on a flat surface 51, for example a floor, indicated in FIGS. 9-12 by a dot-dash line. From the wheels 47, 48, 49, 50, a stand 52 leads up to a cassette-holder 54 which is mounted in an articulated manner relative to a raisable and lowerable part 53 of the stand 52. In the example, the articulated mounting consists of an articulation arrangement 55 with a horizontal articulation pin 56, or more precisely an articulation pin 56 which extends essentially parallel to the rolling direction of the wheels 47, 48, 49, 50, that is to say the surface 51. The position of the cassette-holder 54 can be locked relative to the stand 52, either in at least one fixed step or continuously. The stand 52 comprises means, for example hydraulic means such as a column with a hydraulic cylinder 57, for raising and lowering the cassette-holder 54. The cassette-holder 54 consists of a plane portion 58 and a pocket 59. The cassette 14 normally rests against the plane portion 58 and/or the pocket 59 when the cassette 14 is inserted in the pocket 59. FIG. 8 shows the relief trolley 46 from above, without cassette, the cassette-holder 54 extending, in the position shown, essentially at right angles to the main direction of the stand 52. FIG. 9 shows the relief trolley 46 in a view from the front with a cassette 14 resting in the pocket 59, the cassette-holder 54 being folded so that it extends essentially parallel to the stand 52. Furthermore, the cassette-holder 54 in FIG. 9 is raised relative to a lowest level with the aid of the means 57 for raising and lowering the cassette-holder 54.

Figure 10:
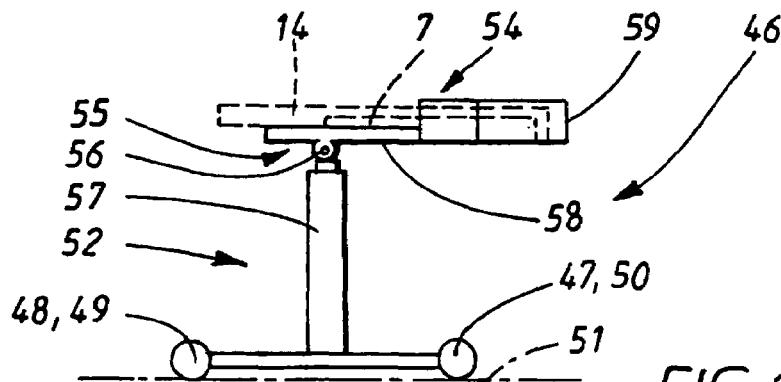
Figure 11:
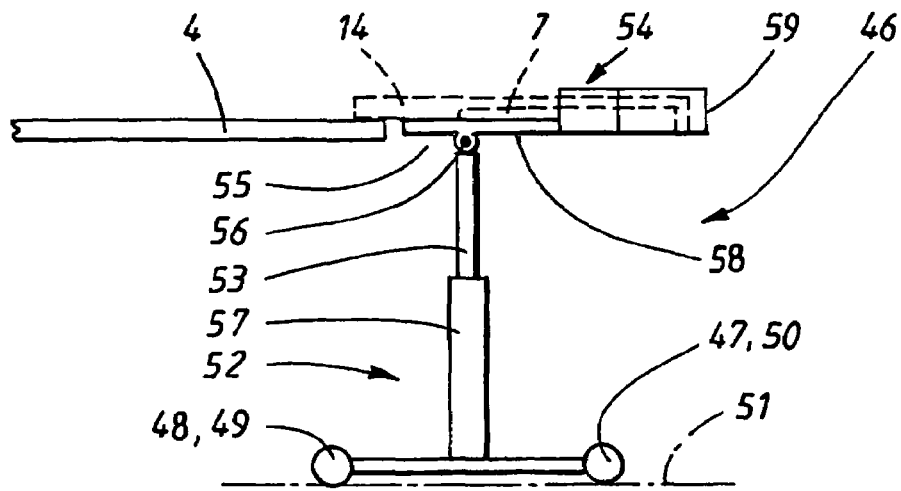
Figure 12:
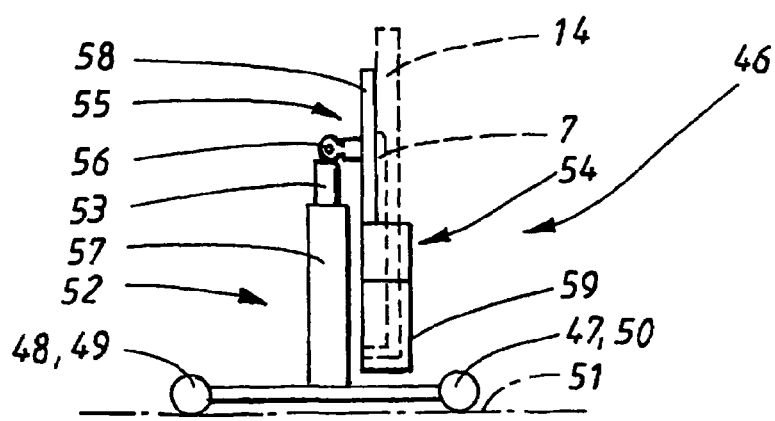

The cassette 14 and a film roll 7 inserted in the cassette are indicated in FIGS. 10-12 by broken lines. FIG. 10 shows the relief trolley 46 in a side view with the cassette-holder 54 lowered to a lowest level. Here, the cassette-holder 54 extends essentially at right angles to the stand 52. In FIG. 11, the cassette-holder 14 has been raised so that the cassette 14 is located at the level of a circular table 4 to which the film roll 7 is to be transferred or from which it has been moved. FIG. 12 shows a side view with the cassette-holder 54 lowered to a lowest level, the cassette-holder 54 also being folded so that it extends essentially parallel to the stand 52.

With the aid of the relief trolley 46, the cassette 14 can be handled in a very simple manner with a number of lifting operations being eliminated. For example, an operator starts with the trolley 46 in the position according to FIG. 12 and lifts the cassette 14 with the associated film roll 7 into the pocket 59 of the cassette-holder 54. The operator then folds the cassette-holder 54 up so that it is located in a position according to FIG. 10 and locks it in this position. The articulation arrangement 55 is positioned in such a way that the cassette-holder 54, with or without a cassette 14 inserted, has its centre of gravity located to the right, see FIGS. 10-12, of the articulation arrangement 55. The trolley 46 can then be moved up to the circular table 4 concerned where the cassette-holder 54 can be raised into such a position that the cassette 14 and the circular table 4 are located at a corresponding level in relation to one another. The cassette 14 can then be fitted against the circular table 4, and the film roll 7 can be pulled out of the cassette 14 and across onto the circular table 4 as described earlier. In a similar way, corresponding actions are performed in reverse order when a film roll 7 is to be removed from the circular table 4 and loaded on the relief trolley 46.

It is conceivable in this respect that cassettes 14 which contain film rolls 7 are stored in essentially horizontal compartments (not shown), so that no lifting is involved when the cassette 14 with the associated film roll 7 is to be moved between storage and the relief trolley 46. The relief trolley 46 is then guided next to the storage space for cassettes 14, after which the cassette-holder 54 is adjusted vertically so that its vertical level corresponds to the vertical level of the cassette 14 concerned. The cassette 14 concerned is then moved into the pocket 59 of the cassette-holder 54. It is also conceivable that only film rolls 7 are stored in such essentially horizontal compartments, and that an empty cassette 14 is from the outset positioned in the relief trolley 46 when it is then guided next to the storage space. In this case, the cassette-holder 54 is adjusted vertically so that the vertical level of the cassette 14 corresponds to the vertical level of the film roll 7 concerned. The film roll 7 concerned is then moved into the cassette 14.

The invention is not limited to what is stated above, but various embodiments are possible within the scope of the patent claims. For example, the inner side of the connecting part 17 can have shapes other than the curved shape and still constitute an excellent support for the film roll 7; it can be V-shaped, for example. It can also be covered with a soft material (not shown) in order to afford shock absorption between the connecting part 17 and the film roll 7. It is not necessary either for the delimiting contours of the first and second portions 15, 16 to follow the external shape of the connecting part 17, but they can be arranged freely. For example, the outer delimiting contours of the first and second portions 15, 16 can be arranged so that they are essentially straight and at right angles to the centre line 21 at the same time as they cover the connecting part 17. Such an embodiment would allow easier upright storage of the cassette 14 on a floor surface when the receiving side 20 faces the floor surface.

Nor does the cassette have to rest against the circular table 4, 5 on bearing supports belonging to the connecting part 17, but the bearing supports 25, 26 can instead, for example, be separately arranged on the carrying legs 30, 31 of the first portion.

The shapes indicated as being curved can allow maintained functioning of the invention without being curved. The contact edge 27 which is intended to bear against the edge 28 of the circular table can be V-shaped, for example, and still constitute a good bearing support against the edge 28 of the circular table.

Figure 13:
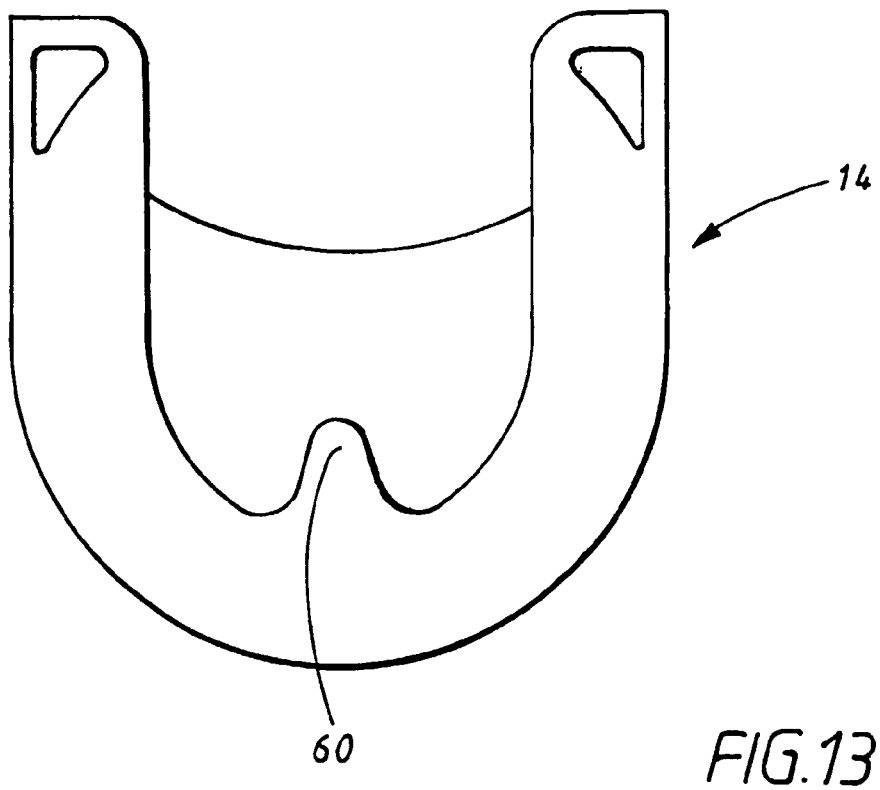
FIG. 13 shows a simplified view of a cassette according to the invention equipped with a tongue.

If, when the film roll 7 is fully inserted in the cassette 14, the centre ring 36 is completely free in relation to the gripping recess 32, there is a risk that, in an unfavourable situation, the centre ring 36 may fall out. In a preferred embodiment, the gripping recess 32 can therefore be made with a tongue 60 as shown in FIG. 13.

Figure 14:
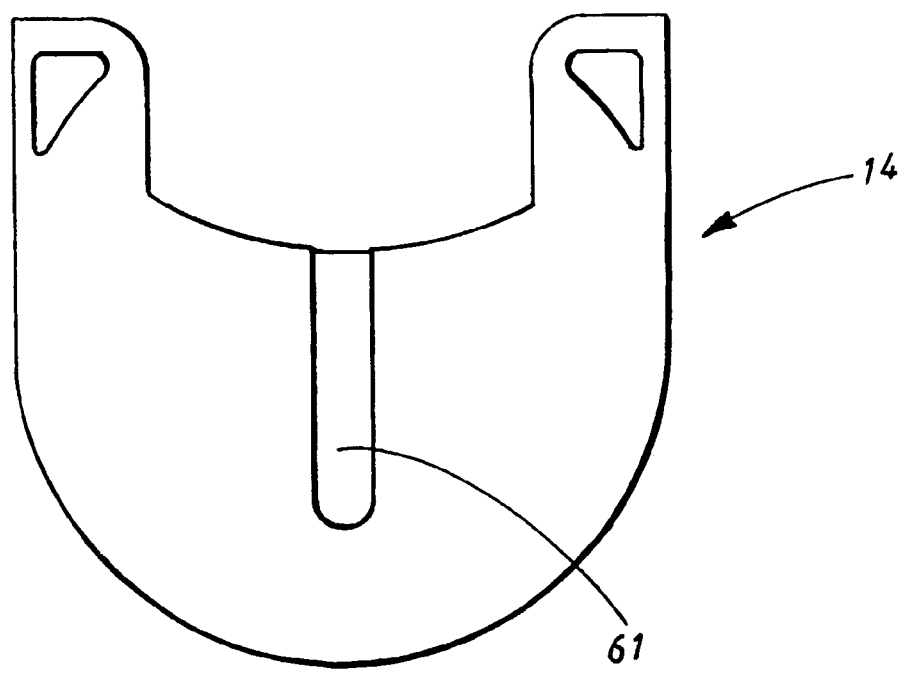
FIG. 14 shows a simplified view of a cassette according to the invention equipped with a gripping groove.

Universal centre rings (not shown) adapted specially for the cassette 14 can be used, which centre rings are made so that the pins belonging to them do not have protruding parts as is the case for the centre rings described earlier, the recessed part 39 then not being required. Instead, special interacting fastening means (not shown) can be arranged on such universal centre rings and the second portion 16 in order to fasten the centre rings to the cassette. If the pins have no protruding parts, the gripping recess 32 can moreover in another preferred embodiment be made as a gripping groove 61 as shown in FIG. 14, the film 7 then having better protection against external influences. As the centre rings normally used belong to the film tower used by the cinema concerned, universal centre rings are also appropriate if the complete film rolls are to be sent between different cinemas.

The invention claimed is:

1. A cassette for storing cinema film rolls and for moving said cinema film rolls between a substantially horizontal circular table and said cassette, comprising a first side portion, a second side portion substantially parallel to said first side portion, a connecting portion connecting said first and second side portions, said connecting portion defining a distance between said first and second side portions which is greater than the thickness of said cinema film roll, said first and second side portions including a portion having a substantially circular shape corresponding to the shape of said cinema film rolls, and defining an opening for moving said cinema film rolls into said cassette, said second portion including a contact edge defining said opening, and a pair of bearing supports extending beyond said first portion and said contact edge of said second portion of said cassette for providing support and weight relief against said substantially horizontal circular table when said film roll is being moved from said substantially circular table to said cassette.

2. The cassette according to claim 1 wherein said connecting portion includes a substantially circular receiving portion against which said cinema film roll rests during storage and transporting of said cassette.

3. A cassette according to claim 1 wherein said first portion includes a gripping recess which exposes a portion of said cinema film roll when it is contained within said cassette and which assists in moving said cinema film roll in and out of said cassette.

4. A cassette according to claim 1 wherein said contact edge is concave and is adapted for application to the peripheral edge of said substantially horizontal circular table so as to form a support against said peripheral edge.

5. A cassette according to claim 1 wherein said first portion includes at least one cutout opening providing handles for lifting and carrying said cassette in a vertical position, and wherein said second portion includes a pair of cutout openings juxtaposed with said pair of bearing supports located beyond said first and second portions of said cassette to provide handles for carrying said cassette in a horizontal position.

6. A cassette according to claim 1 including a close fitting cover for protecting said cinema film roll during transport.

* * * * *